United States Patent
Gupta et al.

(10) Patent No.: US 8,443,326 B1
(45) Date of Patent: May 14, 2013

(54) SCAN CHAIN RE-ORDERING IN ELECTRONIC CIRCUIT DESIGN BASED ON REGION CONGESTION IN LAYOUT PLAN

(75) Inventors: Vishal Gupta, Noida (IN); Sarvesh Verma, Noida (IN)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/442,864

(22) Filed: Apr. 10, 2012

(51) Int. Cl.
*G06F 17/50* (2006.01)

(52) U.S. Cl.
USPC ........... 716/131; 716/126; 716/130; 716/135; 716/139

(58) Field of Classification Search .................. 716/126, 716/130–131, 135, 139
See application file for complete search history.

(56) References Cited

U.S. PATENT DOCUMENTS

| | | | |
|---|---|---|---|
| 6,434,733 B1 * | 8/2002 | Duggirala et al. | 716/124 |
| 6,539,509 B1 | 3/2003 | Teene | |
| 6,907,594 B2 * | 6/2005 | Aoki | 716/129 |
| 7,127,695 B2 * | 10/2006 | Huang et al. | 716/103 |
| 7,181,664 B2 | 2/2007 | Lee | |
| 7,188,323 B2 | 3/2007 | Wang | |
| 7,681,165 B2 * | 3/2010 | Peters et al. | 716/119 |
| 7,958,472 B2 * | 6/2011 | Wohl et al. | 716/106 |
| 7,996,805 B2 * | 8/2011 | Pasqualini | 716/124 |
| 8,099,702 B2 * | 1/2012 | Hou et al. | 716/131 |
| 2004/0221253 A1 * | 11/2004 | Imper et al. | 716/13 |

OTHER PUBLICATIONS

Gupta P., Kahng. A. B., Mantik, S., Routing-aware scan chain ordering. IEEE Proceedings of the ASP-DAC 2003. Asia and South Pacific Design Automation Conference, Jan. 21-24, 2003, pp. 857-862.

* cited by examiner

*Primary Examiner* — Naum Levin
(74) *Attorney, Agent, or Firm* — Charles Bergere

(57) ABSTRACT

A method for reordering scan chain segments of scan chains in an electronic circuit design includes identifying congestion areas on a congestion map. A routing preference for each congestion area is determined. Scan cells associated with each congestion area are formed into the scan chain segments and then the scan chain segments are re-ordered based on the routing preference of the corresponding congestion area.

16 Claims, 3 Drawing Sheets

| Row no. | Scan Ch1 | Physical Location | Scan Ch2 | Physical Location | Scan Ch3 | Physical Location | Scan Ch4 | Physical Location |
|---|---|---|---|---|---|---|---|---|
| 1 | FF1 | Loc110 | FF1 | Loc210 | FF1 | Loc310 | FF1 | Loc410 |
| 2 | FF2 | Loc111 | FF2 | Loc211 | FF2 | Loc311 | FF2 | Loc411 |
| 3 | FF3 | Loc112 | FF3 | Loc213 | FF3 | Loc312 | FF3 | Loc412 |
| 4 | FF4 | Loc113 | FF4 | Loc210 | FF4 | Loc313 | FF4 | Loc413 |
| 5 | FF5 | Loc114 | FF5 | Loc211 | FF5 | Loc314 | FF5 | Loc414 |
| 6 | FF6 | Loc115 | FF6 | Loc213 | FF6 | Loc315 | FF6 | Loc415 |
| 7 | FF7 | Loc16 | FF7 | Loc210 | FF7 | Loc316 | FF7 | Loc416 |
| 8 | FF8 | Loc117 | FF8 | Loc211 | FF8 | Loc317 | FF8 | Loc417 |
| 9 | FF9 | Loc118 | FF9 | Loc213 | FF9 | Loc318 | FF9 | Loc418 |
| 10 | FF10 | Loc119 | FF10 | Loc210 | FF10 | Loc319 | FF10 | Loc419 |

SCAN CHAIN RE-ORDERING IN ELECTRONIC CIRCUIT DESIGN BASED ON REGION CONGESTION IN LAYOUT PLAN

BACKGROUND OF THE INVENTION

The present invention relates generally to electronic circuit designs, and, more particularly, to a method for scan chain re-ordering in electronic circuit designs.

Electronic design automation (EDA) tools are widely used to design systems-on-a-chip (SoC). Designing an SoC includes preparing a layout/floor plan for various circuit components, including standard cells, of the SoC. The layout plan is prepared while optimizing several placement objectives, viz., total net-length, timing, congestion, power, and placement runtime minimization. Minimizing the total net-length of the various standard cell nets is a key objective of a layout plan because it helps to ensure minimum die area, power consumption, and signal delays. Additionally, EDA tools ensure that the total net-length is optimized to prevent congestion in the SoC layout plan.

EDA tools further optimize connections of scan-nets that form scan chains in conjunction with standard cells. The scan-nets are optimized using various algorithms including horizontal, vertical, and minimum-net-length algorithms to meet the placement objectives.

However, conventional EDA tools do not facilitate 'region-based' scan chain reordering. 'Region-based' scan chain reordering is useful in relieving congestion in layout plans that include specific regions with congestion in one direction, either vertical or horizontal. Further, conventional EDA tools do not facilitate 'partial scan chain reordering', i.e., reordering multiple portions of a scan chain (scan chain segments) in horizontal or vertical directions based on a type of congestion (horizontal or vertical) occurring in a region of the layout plan with which the scan chain segment is associated.

Therefore, it would be advantageous to have an EDA tool that facilitates region-based scan chain reordering and partial scan chain segment reordering and that overcomes the above-mentioned limitations of existing EDA tools.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

FIG. 2 is a table illustrating association of flip-flops with a plurality of scan chains in accordance with an embodiment of the present invention.

DETAILED DESCRIPTION OF THE INVENTION

Figure 1:
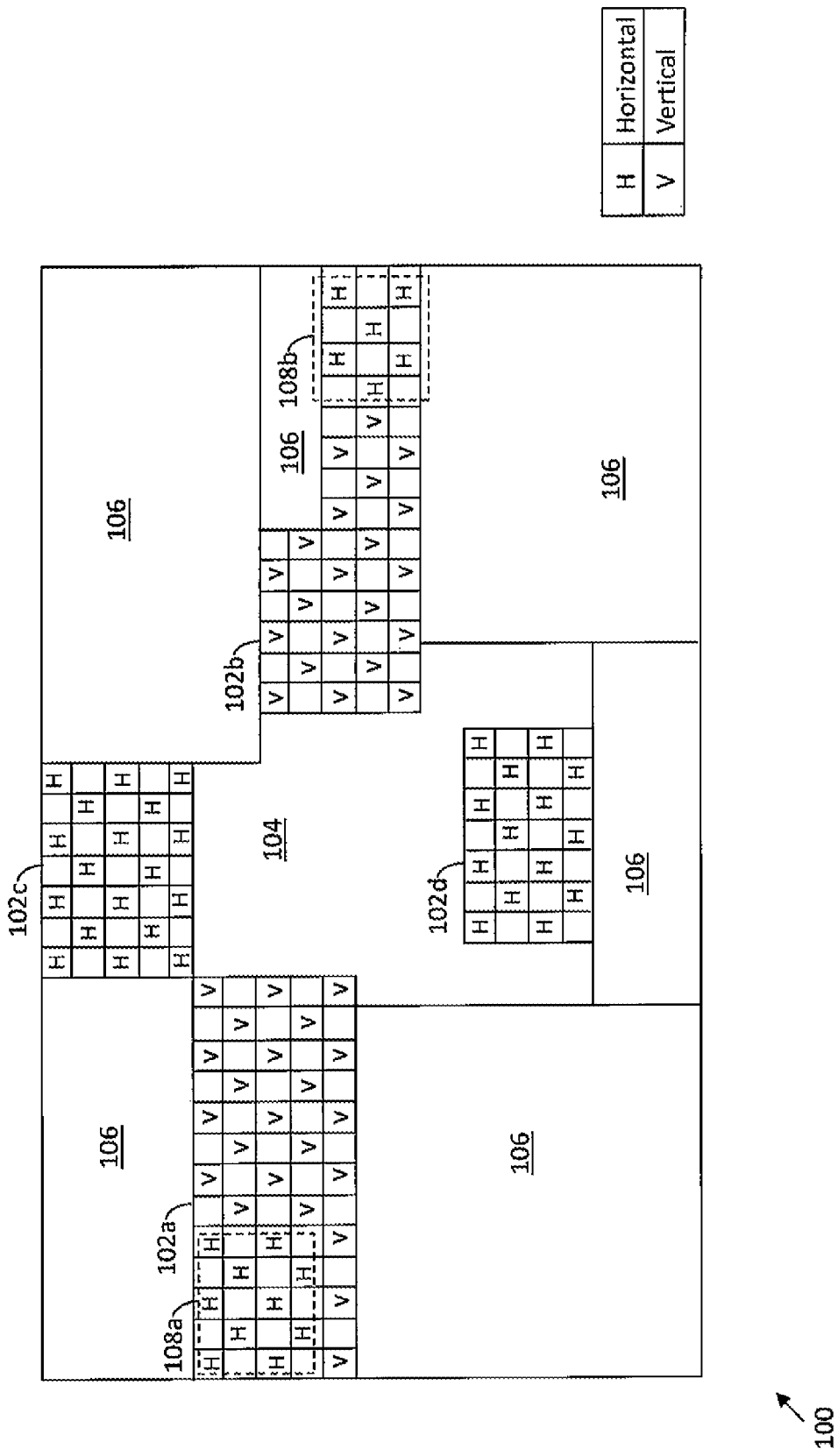
FIG. 1 is a schematic diagram of a congestion map illustrating congestion areas in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention a method for reordering a scan chain segment of a plurality of scan chains in an electronic circuit design is provided. The reordering is performed by using an electronic design automation (EDA) tool that executes on a processor. Each scan chain includes a plurality of scan cells. A plurality of congestion areas are identified in the plurality of scan chains, based on a congestion map generated by the EDA tool. Each congestion area includes at least one congestion portion. A routing preference for the at least one congestion portion is determined. Further, routing preference attributes are assigned to scan cells of the at least one congestion portion. The scan chain segment is formed using a first set of scan cells from the at least one congestion portion, in which scan cells therein have identical routing preference attributes. Thereafter, the scan chain segment is reordered based on the routing preference attributes of the first set of scan cells.

Various embodiments of the present invention provide a method for reordering the scan chain segments formed using scan cells associated with congestion areas. The congestion areas are identified on a congestion map generated by an EDA tool. The congestion areas include portions of scan chains, each of which includes scan cells. A routing preference for each congestion area is determined and routing preference attributes are assigned to the corresponding scan cells, accordingly. Thereafter, scan chain segments are formed using scan cells that have identical routing preference attributes. The scan cells may be associated with the same scan chain or with different scan chains. Thereafter, the scan chain segments are reordered based on the routing preference attributes using horizontal, vertical, and minimum-net-length algorithms. Thus, the scan chains are divided into segments based on a type of congestion present (horizontal or vertical congestion) in various portions of the scan chains and subsequently reordered based on the type of congestion in each segment, which facilitates 'partial' reordering of the scan chains and improves routability in the SoC design. Additionally, the method facilitates selecting areas of congestions and enables a higher level of control during placement and routing stages of the SoC design, leading to faster realization of an optimal SoC design. Further, reordering scan chain segments according to the method of the present invention ensures minimal impact on other design parameters (timing/routing/congestion) when the SoC design proceeds in to advanced stages of a design cycle.

Referring now to FIG. 1, a schematic diagram of a congestion map 100 illustrating congestion areas in a SoC in accordance with an embodiment of the present invention is shown. The congestion map 100 includes first through fourth congestion areas 102a-102d (together referred to as congestion areas 102), a default re-ordering area 104, and a hard-macro area 106. The first and second congestion areas 102a and 102b include corresponding first and second congestion portions 108a and 108b.

The congestion areas 102 include scan cells (not shown) used for scan chain testing of the SoC. The scan cells are associated with multiple scan chains. The congestion map 100 is a graphical representation of routing congestion for a SoC design and is generated by an EDA tool. In an embodiment of the present invention, the congestion areas 102 are marked by a user by inputting coordinates for each congestion area, with reference to the congestion map 100, into the EDA tool. In another embodiment of the present invention, the congestion areas 102 are marked by the EDA tool based on an American Standard Code for Information Interchange (ASCII) file generated by the EDA tool. The congestion areas 102 experience either horizontal or vertical routing congestion. A routing preference for each congestion area 102 is determined based on the congestion present in that area. For example, if the first congestion area 102a has congestion in the horizontal direction, the routing preference for the first congestion area 102a is vertical. In another embodiment of the present invention, the user specifies one or more collections of instances/flip-flops associated with the SoC design along with the corresponding routing preferences. Thereafter, scan chain segments associated with the first congestion area 102a are reordered based on the routing preference using vertical and minimum-net-length algorithms. The steps for determining the routing preference, forming the scan chain segments, and reordering the scan chain segments for a congestion area are explained in detail in conjunction with FIG. 3.

In an embodiment of the present invention, the first and second congestion areas 102a and 102b include the first and second congestion portions 108a and 108b. The first and second congestion portions 108a and 108b experience congestion in a different direction than remaining portions of the first and second congestion areas 102a and 102b, respectively. A routing preference for each of the first and second congestion portions 108a and 108b is determined based on the type of congestion present in a congestion portion. For example, when the first congestion portion 108a has congestion in vertical direction, the routing preference for the first congestion portion 108a is horizontal. Further, scan chain segments associated with the first congestion portion 108a are re-ordered using horizontal and minimum-net-length algorithms based on the routing preference. The steps for determining the routing preference, forming the scan chain segments, and re-ordering the scan chain segments for a congestion portion are explained in detail in conjunction with FIG. 3. In an embodiment of the present invention, the first and second congestion portions 108a and 108b are marked by the user by inputting coordinates, with reference to the congestion map 100, for each congestion portion. In another embodiment of the present invention, the first and second congestion portions 108a and 108b are marked by the EDA tool based on the ASCII file generated by the EDA tool.

The default reordering area 104 does not have congestion in any specific direction, and therefore scan cells therein are routed based on default horizontal, vertical, and minimum-length algorithms. The hard-macro area 108 includes predesigned blocks, for example, memory cells.

Referring now to FIG. 2, a table 200 illustrating association of flip-flops with a plurality of scan chains in accordance with an embodiment of the present invention is shown. The table 200 shows physical locations Loc110-Loc419 of sets of flip-flops FF1-FF10 associated with scan chains Scan Ch1-Ch4. In this disclosure, a flip-flop is the smallest unit of a scan chain, two or more series connected flip-flops form a scan cell, and multiple series-connected scan cells form a scan chain. The table 200 also shows association of the scan chains and corresponding flip-flops in the congestion areas 102 and the first and second congestion portions 108a and 108b (see also FIG. 1). For example, the flip-flops FF1-FF3 of Scan Ch1 are associated with the first congestion area 102a and therefore have routing preference attributes indicating a vertical routing preference. Flip-flops FF4-FF6 also belong to Scan Ch1 and are associated with the first congestion portion 108a and have routing preference attributes indicating horizontal routing preference. Flip-flops FF7-FF10 of Scan Ch1, flip-flops FF1, FF6, and FF7 of Scan Ch2, and flip-flops FF4-FF7 of Scan Ch3 are associated with the second congestion area 102b and have routing preference attributes indicating a vertical routing preference. the associations of the remaining flip-flops with the congestion areas/portions may be similarly established.

Figure 3:
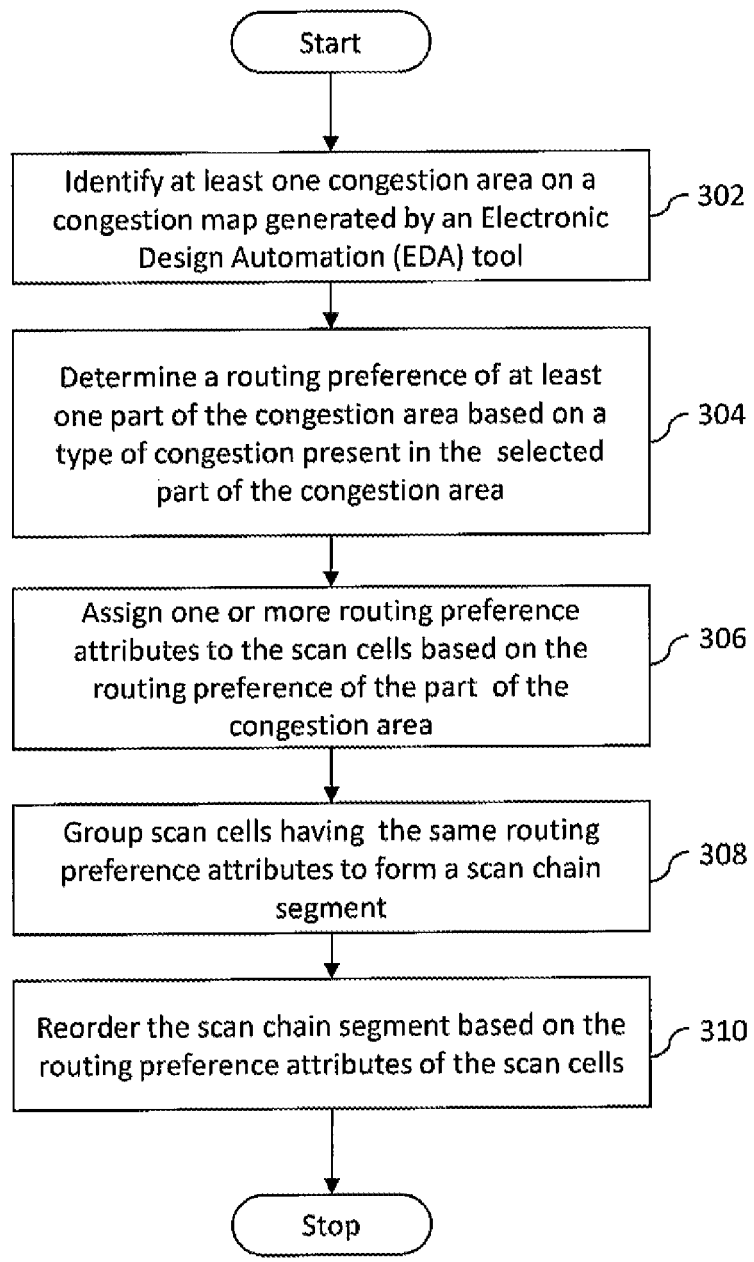
FIG. 3 is a flowchart illustrating a method for re-ordering a scan chain segment in accordance with an embodiment of the present invention.

Referring now to FIG. 3, a flowchart illustrating a method for re-ordering a scan chain segment of a plurality of scan chains in an electronic circuit design in accordance with an embodiment of the present invention is shown. FIG. 3 will be explained in conjunction with FIGS. 1 and 2.

At step 302, the congestion areas 102 are identified in the congestion map 100 generated by the EDA tool. The first and second congestion areas 102a and 102b include the first and second congestion portions 108a and 108b, respectively. In an embodiment of the present invention, the congestion map 100 is a graphical representation of routing congestion for the SoC design and generated by the EDA tool. Each congestion area 102 includes a plurality of scan cells that are associated with a plurality of scan chains.

At step 304, a routing preference for the congestion areas 102 and the first and second congestion portions 108a and 108b is determined. The routing preference is in a direction opposite to a direction of the congestion present in a congestion area/portion. For example, congestion in the first congestion portion 108a is in the horizontal direction, therefore the routing preference indicates the vertical direction as the preferred routing direction. Similarly, congestion in the third congestion area 102c is in the vertical direction, therefore the routing preference indicates the horizontal direction as the preferred routing direction. Further, congestions in the first and second congestion portions 108a and 108b are in a direction different from congestions in the first and second congestion areas 102a and 102b, respectively. In an embodiment of the present invention, the user specifies one or more collections of instances/flip-flops associated with the SoC design along with the corresponding routing preferences. Note, the congestion may be caused due to a scarcity of routing resources in the SoC. Congestion in the scan-nets is resolved during the design stage using algorithms such as horizontal, vertical, and minimum-net-length algorithms. Such algorithms are well known in the art, and therefore their description has been omitted so as not to obfuscate the present description. Failure to resolve congestion by applying such algorithms necessitates an increase of die-area to increase the routing resources.

At step 306, routing preference attributes are assigned to scan cells of the first and second congestion portions 108a and 108b and the first through fourth congestion areas 102a-102d. The routing preference attributes are assigned based on the routing preference for the corresponding congestion area/portion with which the scan cells are associated. For example, the scan cells associated with the first and second congestion portions 108a and 108b are assigned routing preference attributes that indicate horizontal direction as a preferred routing direction. In an embodiment of the present invention, in the absence of a congestion portion associated with a congestion area, the complete congestion area is treated as the congestion portion and the routing preference attributes are assigned to the scan cells of the congestion area based on the routing preference of the congestion area. For example, the scan cells associated with the third congestion area 102c are assigned routing preference attributes based on the routing preference of the third congestion area 102c.

At step 308, scan chain segments are formed using the scan cells associated with the congestion areas 102 and the first and second congestion portions 108a and 108b. The scan chain segments formed include the scan cells that have identical routing preference attributes. For example, the table 200 depicts flip-flops FF1-FF10, associated with scan chains Scan Ch1-Scan Ch4. The flip-flops associated with scan cells that are associated with the first congestion area 102a and have identical routing preference attributes, i.e. the flip-flops FF1-FF3 associated with the Scan Ch1, are formed into the scan chain segment. In an embodiment of the present invention, the scan chain segment is formed from scan cells that are associated with different scan chains. For example, the scan chain segment formed using the scan cells associated with the second congestion area 102b include flip-flops that are associated with different scan chains, i.e., the flip-flops FF7-FF10 associated with Scan Ch1 and flip-flops FF1, FF6, and FF7 associated with Scan Ch2 and flip-flops FF4-FF7 associated with Scan Ch3. Since the flip-flops mentioned above are associated with the scan cells that have identical routing preference attributes, they are formed into one scan chain segment.

At step 310, the scan chain segment is reordered based on the routing preference attributes of the scan cells associated with the scan chain segment. For example, the scan chain segment formed using the scan cells associated with the first congestion portion 108a are reordered in horizontal direction. Further, the scan chain segment formed using the scan cells associated with the second congestion area 102b are reordered in vertical direction. Reordering the scan chain segment entails reconnecting the associated scan cells based on the horizontal, vertical, and minimum-net-length algorithms, thereby relieving congestion in the SoC design. It will be understood by persons skilled in the art that although the scan chains are divided into various scan chain segments and reordered thereafter, the original scan chain sanity is maintained throughout the above described steps.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

What is claimed is:

1. A method for reordering a scan chain segment of a plurality of scan chains in an electronic circuit design using an electronic design automation (EDA) tool executing on a processor, wherein each scan chain includes a plurality of scan cells, the method comprising:
   accessing the integrated circuit design stored in the memory and generating a congestion map using the EDA tool executing on the processor;
   identifying a plurality of congestion areas in the plurality of scan chains, based on the congestion map generated by the EDA tool, wherein the plurality of congestion areas is marked by the EDA tool on the congestion map and wherein each congestion area includes at least one congestion portion;
   determining a routing preference for the at least one congestion portion;
   assigning routing preference attributes to scan cells of the at least one congestion portion;
   forming the scan chain segment of a first set of scan cells from the at least one congestion portion, wherein scan cells therein have identical routing preference attributes; and
   re-ordering the scan chain segment based on the routing preference attributes of the first set of scan cells,
   wherein re-ordering the scan chain segment includes connecting scan cells of scan chain segments associated with different scan chains in the same congestion area.

2. The method of claim 1, further comprising allowing a user to mark the plurality of congestion areas on the congestion map.

3. The method of claim 1, wherein the plurality of congestion areas is identified based on an American Standard Code for Information Interchange (ASCII) file generated by the EDA tool.

4. The method of claim 1, wherein the at least one congestion portion has a horizontal congestion.

5. The method of claim 1, wherein the at least one congestion portion has a vertical congestion.

6. The method of claim 1, wherein re-ordering the scan chain segment includes reconnecting the first set of scan cells using at least one of horizontal, vertical, and minimum-net-length algorithms.

7. The method of claim 1, wherein re-ordering the scan chain segment includes reconnecting scan cells of multiple scan chain segments associated with a scan chain, wherein the scan cells have identical routing preference attributes.

8. The method of claim 1, wherein a scan cell includes a plurality of series-connected flip-flops.

9. An EDA tool including at least one processor and at least one memory in communication with the processor, wherein the memory is used to store an electronic circuit design, the EDA tool for re-ordering a scan chain segment of a plurality of scan chains of the electronic circuit design, wherein each scan chain includes a plurality of scan cells, the EDA tool performing steps including:
   accessing by the processor the integrated circuit design stored in the memory and identifying a plurality of congestion areas in the plurality of scan chains, based on a congestion map generated by the EDA tool, wherein the plurality of congestion areas is marked by the EDA tool on the congestion map and wherein each congestion area includes at least one congestion portion;
   determining a routing preference for the at least one congestion portion;
   assigning routing preference attributes to scan cells of the at least one congestion portion;
   forming the scan chain segment of a first set of scan cells from the at least one congestion portion, wherein the scan cells of the first set of scan cells have the same routing preference attributes; and
   re-ordering the scan chain segment based on the routing preference attributes of the first set of scan cells,
   wherein re-ordering the scan chain segment includes connecting scan cells of scan chain segments associated with different scan chains in the same congestion area.

10. The EDA tool of claim 9, further including the step of allowing a user to mark the plurality of congestion areas on the congestion map.

11. The EDA tool of claim 9, wherein the plurality of congestion areas is identified using an American Standard Code for Information Interchange (ASCII) file generated by the EDA tool.

12. The EDA tool of claim 9, wherein the at least one congestion portion has a horizontal congestion.

13. The EDA tool of claim 9, wherein the at least one congestion portion has a vertical congestion.

14. The EDA tool of claim 9, wherein reordering the scan chain segment includes reconnecting the first set of scan cells using at least one of horizontal, vertical, and minimum-net-length algorithms.

15. The EDA tool of claim 9, wherein reordering the scan chain segment includes reconnecting scan cells of multiple scan chain segments associated with a scan chain, wherein the scan cells have identical routing preference attributes.

16. The EDA tool of claim 9, wherein a scan cell includes a plurality of series-connected flip-flops.

\* \* \* \* \*